(12) United States Patent
Sharon et al.

(10) Patent No.: US 7,512,185 B2
(45) Date of Patent: Mar. 31, 2009

(54) DUAL CARRIER MODULATOR FOR A MULTIBAND OFDM UWB TRANSCEIVER

(75) Inventors: Eran Sharon, Rishon-Lezion (IL); Simon Litsyn, Givat Shmuel Israel (IL); Yossi Erlich, Hod Hasharon (IL)

(73) Assignee: Infineon Technologies AG, Munich (DE)

( * ) Notice: Subject to any disclaimer, the term of this patent is extended or adjusted under 35 U.S.C. 154(b) by 635 days.

(21) Appl. No.: 11/040,475

(22) Filed: Jan. 21, 2005

(65) Prior Publication Data

US 2005/0195765 A1 Sep. 8, 2005

Related U.S. Application Data

(60) Provisional application No. 60/559,524, filed on Apr. 5, 2004, provisional application No. 60/551,309, filed on Mar. 8, 2004.

(51) Int. Cl.
*H04K 1/10* (2006.01)
*H04L 27/28* (2006.01)

(52) U.S. Cl. .................................. 375/260
(58) Field of Classification Search ............ 375/260
See application file for complete search history.

(56) References Cited

U.S. PATENT DOCUMENTS

| | | | | |
|---|---|---|---|---|
| 4,843,352 | A * | 6/1989 | Kamisaka et al. | 332/104 |
| 6,108,369 | A * | 8/2000 | Ovesjo et al. | 375/146 |
| 7,313,190 | B2 * | 12/2007 | Balakrishnan et al. | 375/260 |
| 2002/0085641 | A1 | 7/2002 | Baum | |
| 2003/0031278 | A1 | 2/2003 | Kang et al. | |
| 2004/0141548 | A1 * | 7/2004 | Shattil | 375/146 |
| 2004/0218683 | A1 * | 11/2004 | Batra et al. | 375/261 |

(Continued)

FOREIGN PATENT DOCUMENTS

EP 0 887 976 A2 12/1998

(Continued)

OTHER PUBLICATIONS

Batra, Anuj, "Multi-band OFDM Physical Layer Proposal for IEEE 802.15 Task Group 3a", IEEE P802.15 Working Group for Wireless Personal Area Networks (WPANS), vol. P802.15-03/268r2, Nov. 10, 2003, XP002336997, pp. 1-69, (69 pages).

(Continued)

*Primary Examiner*—David C Payne
*Assistant Examiner*—Nader Bolourchi
(74) *Attorney, Agent, or Firm*—Maginot, Moore & Beck

(57) ABSTRACT

A Dual Carrier Modulator (DCM) for a Multiband OFDM (Orthogonal Frequency Division Multiplexing) Transceiver of a Ultra Wide Band (UWB) wireless personal access network transmitting OFDM modulated symbols is provided, wherein each OFDM symbol is modulated by a predetermined number of encoded bits. The Dual Carrier Modulator comprises a grouping unit for grouping $N_{CBPS}$ encoded bits of a serial bit stream into bit groups each having a predetermined number of bits. The Dual Carrier Modulator also comprises a mapping unit for mapping each bit group received from said grouping unit to complex symbols using an orthogonal transform. The Dual Carrier Modulator further comprises a reordering unit for reordering the complex symbols mapped by said mapping unit. Each complex symbol is provided to modulate a corresponding data tone of an OFDM symbol.

5 Claims, 9 Drawing Sheets

U.S. PATENT DOCUMENTS

2004/0228269 A1* 11/2004 Balakrishnan et al. ...... 370/208
2005/0078598 A1* 4/2005 Batra et al. ................. 370/206

FOREIGN PATENT DOCUMENTS

EP        1 054 541 A2    11/2000

OTHER PUBLICATIONS

"ITU-T Recommendation G.992.1", Jun. 1999, pp. 42-52, (11 pages).

Weon-Cheol, Lee et al., "Performance Analysis of Viterbi Decoder Using Channel State Information in COFDM System", IEEE Transactions on Broadcasting IEEE USA, vol. 44, No. 4, Dec. 1998, XP002337651, pp. 488-496,(9 pages).

* cited by examiner

DUAL CARRIER MODULATOR FOR A MULTIBAND OFDM UWB TRANSCEIVER

CROSS-REFERENCE TO RELATED APPLICATIONS

This application claims the benefit of earlier filed U.S. provisional application No. 60/551,309, filed Mar. 8, 2004 and earlier filed U.S. provisional application No. 60/559,524, filed Apr. 5, 2004.

BACKGROUND

The present invention relates to a Dual Carrier Modulator for a Multiband OFDM transceiver of an ultra wide band (UWB) wireless personal access network.

FIG. 1 shows the transmission of data in a wireless system according to the state of the art. Several transceivers belonging to the same wireless local area network (WLAN) use the same data transmission channel by means of time sharing. At any specific time only one transceiver is transmitting. Accordingly the transmissions from each transceiver are burst like. For helping the receiving transceiver to identify a data transmission burst and for extracting the delivered information data the transmitting transceiver sends a predefined preamble signal preceding the data portion of the data transmission burst. The transceiver that receives the data transmission burst comprises a preamble detection unit that identifies the preamble and thus identifies the data transmission burst. The transceiver uses further the preamble for estimating data transmission and channel parameters such as channel response and carrier and timing offsets that are needed for the data information extraction.

Commonly several communication networks share the same data transmission media. Specifically collocated wireless networks utilize the same frequency spectrum.

FIG. 2 shows two collocated wireless networks according to the state of the art.

Wireless local areas networks (WLAN) represent a new form of communications among personal computers or other devices that wish to deliver digital data. A wireless network is one that does not rely on cable as the communications medium. Whether twisted pair, coax, or optical fibers, hard wiring for data communication systems within a building environment is expensive and troublesome to install, maintain and to change. To avoid these disadvantages wireless networks transmit data over the air using signals that cover a broad frequency range from few MHz to a few terahertz. Depending on the frequency involved wireless networks comprise radio wireless networks, microwave wireless networks and infrared wireless networks.

Wireless networks are used mainly for connecting devices within a building or connecting portable or mobile devices to a network. Further applications are keeping mobile devices in contact with a data base and ad hoc networks for example in committee or business meetings.

Wireless local area networks (WLAN) and wireless personal area networks (WPAN) are used to convey information over relatively short ranges. A wireless personal area network (WPAN) is defined in the IEEE 802.15.3 standard.

In many situations and scenarios several wireless local area networks (WLANs) are operated simultaneously with each other in the same local area. A typical situation would be a big office wherein many office cubicles are located belonging to different divisions of the same company, e.g. search division, accounting division, marketing division. The computers of each division are connected in such a situation by means of separate wireless local area networks (WLANs). A wireless local area network (WLAN) comprising several transceivers is referred to as a Piconet.

FIG. 2 shows typical scenario where two wireless local area networks (WLANs) are operated in the same local area.

In the shown example a first transmitting transceiver A2 transmits data to a receiving transceiver A4 of the first wireless local area network WLANA on the data transmission channel of the wireless local area network WLANA. Further a transmitting transceiver B3 of the second wireless local area network WLANB transmits data to a receiving transceiver B1 of the same wireless local network WLANB on the data transmission channel of this wireless local area network. The data exchange between transceivers is performed half duplex, i.e. a transceiver can either send or receive data over a data link to another transceiver of the same wireless local area network. The data are exchanged via data packets.

Each Piconet WLANi has its respective data transmission channel, i.e. the data transmission channel is used by all transceivers of the corresponding Piconet WLANi.

In most cases the frequency resources available for a wireless local area network WLAN are bounded by regulations. Usually a certain frequency band is allocated for the wireless local networks. Within this frequency band each transceiver is required to radiate no more than a specified average power spectral density (PSD).

To operate several wireless local area networks simultaneously several proposals have been made.

In frequency division multiplexing (FDM) systems according to the state of the art the allocated frequency band is divided into several sub-frequency bands. In FDM-system each data transmission channel and consequently each Piconet is using a different frequency sub-band. Thus, data transmission in different Piconets (WLANs) can simultaneously be performed without interference.

The disadvantage of FDM-systems is that the available capacity for each Piconet is reduced compared to the case where any Piconet is allowed to use the entire allocated frequency band.

The channel capacity is given by the following formula:

$$cap = \int \log\left(1 + \frac{PSD(f)}{N(f)}\right) df$$

The capacity of each Piconet is larger if it will be allowed to use the full frequency band instead of just the allocated frequency sub-band. The reduction in the capacity in FDM-systems translates directly to throughput reduction. Consequently the achievable data bit rate for any specific transmitter-receiver distance is reduced in FDM-systems.

In a CDMA-DSSS (Code Division Multiple Access-Direct Sequence Spread Spectrum) system according to the state of the art a direct sequence spread spectrum is used as a modulation scheme. In DSSS a sequence of many short data symbols is transmitted for each information symbol. In order to support several data transmission channels or Piconets different data sequences with low cross correlation between them are used for different data transmission channels.

In a CDMA-DSSS-system each channel can use the entire frequency band until the maximum possible throughput can be achieved. If some Piconets are working in the same area then the transmission of one Piconet is seen as additional noise by the other Piconets.

The disadvantage of the CDMA-DSSS-System is that there exists a so called near-far problem. When a transceiver in one Piconet is transmitting this transmission will be seen as additional noise by other Piconets. The level of the additional noise is proportional to the cross correlation between the spreading sequences and the received power level of the interferer's signal. For example if the interfering transceiver of Piconet A is close to a receiving transceiver of Piconet B, i.e. closer than a transmitting receiver of Piconet B then the added noise level that the receiving transceiver of Piconet B sees causes a significant reduction in the achievable bit rate for the receiver, so that even a complete blocking of the data transmission channel can occur.

A further proposal according to the state of the art to operate several wireless local area networks (WLANs) simultaneously is to use a CDMA-FH(Code Division Multiple Access-Frequency Hopping)-System. In this CDMA-FH-System the original frequency band is divided into several sub-frequency bands. Any transmitting transceiver uses a certain frequency sub-band for a certain time interval and moves then to the next frequency band. A predefined frequency hopping sequence controls the order of sub-frequency bands such that both the transmitting and receiving transceiver has the information when to switch to the next frequency and to what sub-frequency band.

In a conventional CDMA-FH-System the different data transmission channels are assigned with different frequency hopping sequences.

FIG. 3A shows a CDMA-FH-System according to the state of the art with data transmission channels. A CDMA-FH-System with four data transmission channels can operate four Piconets or wireless local area networks (WLANs) simultaneously at the same local area. In the shown example any transceiver uses a certain frequency band for a transmission interval for 242 ns, remains idle for a predetermined guard time of 70 ns and uses the next frequency band within the next transmission interval etc.

The frequency hopping sequence is fixed for any data transmission channel A, B, C, D. In the given example data transmission channel A has the frequency hopping sequence abc, channel B has the frequency hopping sequence acb, channel C has the frequency hopping sequence aabbcc and channel D has the frequency hopping sequence aaccbb.

A collision is a situation when two transceivers use the same frequency band at the same time. For example a collision between data transmission channel A and data transmission channel B occurs during the first transmission interval when both channels A, B use frequency fa and during the fourth transmission interval when both channels A, B use again frequency fa. A further collision is for example between channel B and channel D during the first transmission interval when both channels B, D use frequency a and the sixth transmission interval when both channels B, D use frequency fb.

When the frequency hopping order of two wireless networks differs two transceivers that belong to different wireless local area networks can transmit at the same time. It may happen that both transceivers use the same carrier frequency at the same time.

One possible CDMA-FH solution is based on OFDM and is called Multiband OFDM. In this case the transceiver transmits a single OFDM in one band and then hops to the next band for transmitting the next OFDM symbol. FIG. 3A depicts 6 OFDM symbols for each channel.

As shown in FIG. 3A the Multiband OFDM Transceiver performs in a time frequency interleaving (TFI) mode band-hopping wherein in each frequency band an OFDM symbol is transmitted. The band-hopping sequence is defined by a TFC code (Time frequency code) stored in a memory. Different collocated networks use different TFC codes. This enables simultaneous transmission of different networks. OFDM symbols from collocated networks collide. In common scenarios the collision level enables efficient communication. Yet in some cases the collisions situation is severe and the communication is not efficient. To overcome severe collisions between transmissions of different networks frequency domain separation (known as FDM) between the wireless networks can be implemented. This is achieved by adding TFC codes with constant band usage (fixed frequency bands). Accordingly a Multiband OFDM Transceiver according to the state of the art is switchable between a time frequency interleaving mode (TFI mode) and a fixed frequency interleaving mode (FFI mode). FIG. 3B shows 7 channels (7 TFC) where 4 channels are of TFI type and 3 channels are of FFI type.

As can be seen in FIG. 3B the transceiver occupies in the TFI mode three frequency bands, wherein each frequency band has a predetermined frequency bandwidth.

According to the evolving multiband OFDM standard the period of one OFDM symbol is 312.5 nSec, i.e. a data length of 242.5 nSec (128 samples at 528 Msps) and a silence time of 70 nSec (37 samples at 528 Msps) between two transmissions.

Consequently the OFDM symbol rate RS=3.2 MHz=1/312.5 nSec. When using three frequency bands there are seven possible time frequency codes (TFC). The first four TFC codes define the frequency band hopping sequence when the transceiver is in the TFI mode. When the transceiver is switched to the FFI mode the transceiver transmits the signal in a fixed frequency band. As shown in the following table and in FIG. 3B, the fifth TFC code indicates that transceiver transmits a signal in a first frequency band, the sixth TFC code indicates that the transceiver transmits the signal in a second frequency band and the seventh TFC code indicates that the transceiver transmits a signal in a third frequency band.

The following TFC codes have three frequency bands as summarized in the following table:

TABLE 1

| TFC Index | Code | Type |
|---|---|---|
| 1 | [1, 2, 3] | TFI |
| 2 | [1, 3, 2] | TFI |
| 3 | [1, 1, 2, 2, 3, 3] | TFI |
| 4 | [1, 1, 3, 3, 2, 2] | TFI |
| 5 | [1] | FFI |
| 6 | [2] | FFI |
| 7 | [3] | FFI |

TFC indices 1–7 in the table corresponds to channels A–G in FIG. 3B

A single burst of transmission is called a PLCP frame. FIG. 4 shows the data format of a PLPC frame used by a multiband OFDM transceiver. Each frame consists of a preamble, a header and a payload data section. The PLPC header is transmitted with a constant data rate of 39.4 Mbit per second whereas the payload data is transmitted with different data rates varying between 53.3 Mbit per seconds and 480 Mbit per second depending on the selected operation mode of the OFDM transceiver. The PLCP frame as shown in FIG. 4 consists of a plurality of OFDM symbols, wherein each OFDM symbol consists of a predetermined number ($N_{CBPS}$) of encoded data bits. Each OFDM symbol comprises for instance 100 or 200 encoded data bits depending on the selected data rate. As can be seen from FIG. 3B each OFDM symbol is transmitted within different frequency bands $f_a$, $f_b$, $f_c$ according to a predetermined frequency hopping pattern.

For example three frequency bands $f_a$, $f_b$, $f_c$, are employed by the OFDM transceiver so that seven different frequency hopping patterns are possible as shown in FIG. 3B via a corresponding number of data transmission channels A, B, C, D, E, F, G. Each frequency band $f_a$, $f_b$, $f_c$ employed by the OFDM transceiver comprises a center frequency around which a predetermined number of sub-carriers or tones are provided. A frequency comprises for instance 122 sub-carriers consisting of pilot sub-carriers, guard sub-carriers and data sub-carriers. Each sub-carrier is equidistant to its neighboring sub-carrier and can be modulated separately.

FIG. 5 shows an OFDM transceiver according to the state of the art. The transceiver comprises a transmitter and a receiver which are both connected to a higher communication layer block. The OFDM transceiver according to the state of the art as shown in FIG. 5 is a Multiband OFDM transceiver wherein the transmitter transmits OFDM symbols via a data transmission channel and the receiver receives OFDM symbols from said data transmission channel. The conventional transmitter as shown in FIG. 5 is shown in more detail in FIG. 6. The higher communication layer circuit supplies a bit stream to a header generator which adds the header to the payload received from the higher communication layer. The header generator is connected to an error correction encoder which encodes the received data stream. The error correction encoder is connected on its output side to an interleaving circuit. The interleaving circuit interleaves the received bit stream to increase the performance of the data transmission. The interleaved bit stream is applied to a frequency spreading unit within the transmitter. The frequency spreading unit spreads the received bits in the frequency domain with a frequency spreading factor, FSF, which is set according to the data rate applied by the higher communication layer.

The frequency spreading unit is connected to an OFDM symbol modulator which modulates each subcarrier or data tone within the frequency band depending on the data rate or transmission mode. The OFDM symbol modulator according to the state of the art as shown in FIG. 6 comprises a QPSK-Modulator, an IFFT unit performing an inverse fast Fourier transformation and a parallel to serial converter. The output of the OFDM symbol modulator is connected to the time spreading unit of the transmitter which spreads the OFDM symbols in the time domain with a time spreading factor (TSF) depending on the data rate set by the higher communication layer.

Finally the data stream is forwarded to a frequency hopping transmitter which transmits the interleaved and spread OFDM symbols in a different or the same frequency band $F_a$, $F_b$, $F_c$ according to a predetermined frequency hopping pattern. The frequency hopping pattern is determined by the selected data transmission channel of the OFDM transceiver.

FIG. 7 shows a conventional receiver within the OFDM transceiver as shown in FIG. 5. The receiver shown in FIG. 7 comprises a frequency hopping receiver to which an OFDM symbol demodulator is connected. The demodulated OFDM symbols are de-spread in the frequency domain and in the time domain by a frequency de-spreading unit and a time de-spreading unit.

The received bit stream is de-interleaved by a de-interleaving circuit and an error correction decoder, e.g. a Viterbi decoder is provided for error correction. Finally the header of the received data packet is extracted by a header extraction unit which recognizes the data rate of the received data stream to adjust the de-interleaving circuit, the time and the frequency de-spreading unit and the error correction unit. The OFDM symbol modulator as provided in the conventional transmitter as shown in FIG. 6 has some serious drawbacks.

The OFDM symbol modulator comprises a QPSK-Modulator. The encoded and interleaved binary data is divided into groups of bits and converted into complex numbers representing QPSK constellation points. QPSK-Modulation is used to map groups of 2 coded bits into complex symbols. The OFDM symbols are grouped and sets of pilot tones are added and unused data tones are set to zero. The IFFT unit is provided for converting the signal into the time domain. The output of the IFFT-unit is serialized and transmitted to the air by the frequency hopping transmitter.

Due to the multipath in the wireless media the common response of the data transmission channel is frequency selective. In the transmitter according to the state of the art as shown in FIG. 7 each encoded bit is loaded on one data tone in a single OFDM symbol. If the data tone is corrupted information contained by the encoded bit is changed. When the data tone is completely attenuated by the data transmission channel resulting in a spectral zero or severe tonal signal to noise ratio the information carried by the encoded bit is completely lost. Specifically for high data rates, where no spreading is applied and the code rate is quite high, thus spectral zeros result in performance degradation. Under the selective channel conditions the error correction decoder does not efficiently prevent the loss of bits of severely attenuated data tones. For a given noise level N the signal to noise ratio (SNR) is diminished by the frequency selective channel conditions. The low signal to noise ratio (SNR) of the conventional transmitter according to the state of the art as shown in FIG. 6 causes an increased bit error rate (BER). For a given data rate the OFDM symbol modulator according to the state of the art provided within the conventional transmitter as shown in FIG. 6 does not achieve a reliable communication, i.e. a low bit error rate (BER) when the signal to noise ratio (SNR) of the data transmission channel is low.

Accordingly it is the object of the present invention to provide a modulator for a multiband OFDM transceiver which allows the data transmission over a data transmission channel with a minimum bit error rate (BER) even when the signal to noise ratio (SNR) of the data transmission channel is low.

SUMMARY

The invention provides a dual Carrier Modulator (DCM) for a Multiband OFDM (Orthogonal Frequency Division Multiplexing) Transceiver of a Ultra Wide Band (UWB) wireless personal access network transmitting OFDM modulated symbols, wherein each OFDM symbol is modulated by a predetermined number ($N_{CBPS}$) of encoded bits, said Dual Carrier Modulator comprising:
(a) a grouping unit for grouping $N_{CBPS}$ encoded bits of a serial bit stream into bit groups each having a predetermined number (m) of bits;
(b) a mapping unit for mapping each bit group received from said grouping unit to complex symbols(y); and
(c) a reordering unit for reordering the complex symbols (y) mapped by said mapping unit, wherein each complex symbol (y) is provided to modulate a corresponding data tone of an OFDM symbol.

The Dual Carrier Modulator (DCM) according to the present invention achieves a low bit error rate (BER) for a given signal to noise ratio (SNR) of the data transmission for a given data rate. Accordingly the transceiver including the Dual Carrier Modulator (DCM) according to the present invention can work under tougher data transmission conditions and can tolerate more noise or even a more frequency selective data transmission channel. The performance is improved compared to a conventional MB-OFDM transceiver.

In a preferred embodiment of the Dual Carrier Modulator according to the present invention the grouping unit groups 200 encoded bits to bit groups each having four bits.

In a preferred embodiment of the Dual Carrier Modulator according to the present invention the mapping unit maps bit groups each having four bits respectively to two complex symbols to generate 100 complex symbols for modulating 100 data tones of an OFDM symbol.

In a preferred embodiment of the Dual Carrier Modulator according to the present invention the mapping unit comprises a first mapping stage for mapping uni-polar bit values of the encoded bits within each bit group to bipolar bit values and a second mapping stage which maps the four bipolar bits within each bit group to two complex symbols as follows:

$$\begin{pmatrix} y_n \\ y_{n+50} \end{pmatrix} = \frac{1}{\sqrt{b^2+1}} \begin{pmatrix} 1 & b \\ b & -1 \end{pmatrix} \begin{pmatrix} x_{a(n)} & jx_{a(n)+50} \\ x_{a(n)+1} & jx_{a(n)+51} \end{pmatrix}$$

with $n = 0, 1 \ldots 49$ $$a(n) = \begin{cases} 2n & n = 0, 1, 2, \ldots 24 \\ 2n+50 & n = 25, 26, \ldots 49 \end{cases}$$

wherein b is a constant.

In a preferred embodiment of the Dual Carrier Modulator according to the present invention the mapping unit is formed by a look up table which is stored in a memory.

In a preferred embodiment of the Dual Carrier Modulator according to the present invention the look up table stored in the memory is given as follows:

| Input | | Output (y) | |
|---|---|---|---|
| $X_1$ | $X_2$ | Re $(y_n)$ | Re $(y_{n+50})$ |
| 1 | 1 | $K \cdot (1 + b)$ | $K \cdot (-1 + b)$ |
| 1 | 0 | $K \cdot (1 - b)$ | $K \cdot (1 + b)$ |
| 0 | 1 | $K \cdot (-1 + b)$ | $K \cdot (-1 - b)$ |
| 0 | 0 | $K \cdot (-1 - b)$ | $K \cdot (1 - b)$ |

| Input | | Output (y) | |
|---|---|---|---|
| $X_3$ | $X_4$ | Im $(y_n)$ | Im $(y_{n+50})$ |
| 1 | 1 | $K \cdot (1 + b)$ | $K \cdot (-1 + b)$ |
| 1 | 0 | $K \cdot (1 - b)$ | $K \cdot (1 + b)$ |
| 0 | 1 | $K \cdot (-1 + b)$ | $K \cdot (-1 - b)$ |
| 0 | 0 | $K \cdot (-1 - b)$ | $K \cdot (1 - b)$ |

In a preferred embodiment of the Dual Carrier Modulator according to the present invention the constant b is two.

In a preferred embodiment of the Dual Carrier Modulator according to the present invention the scaling factor K is selected to be $K_0/\sqrt{b^2+1}$ where $K_0$ is the corresponding scaling factor of the QPSK modulation.

The invention further provides a metric computation unit for a multiband-OFDM transceiver of a Ultra Wide Band (UWB) wireless personal access network, said transceiver receiving OFDM symbols transmitted via a data transmission channel wherein each OFDM symbol is dual carrier modulated (DCM) by a predetermined number ($N_{CBPS}$) of encoded bits each modulating two data tone of the OFDM symbol, said metric computation unit comprising:

(a) a channel and noise estimation unit for estimating a channel response and a noise level for each data tone n to calculate a corresponding estimated reception symbol (y(n));

(b) an equalizer which multiplies each estimated reception symbol y(n) with an equalizer coefficient eq(n) to calculate for each data tone n a weighted reception symbol (w(n)=y(n)×eq(n));

(c) a calculation unit which calculates for each bit transmitted via said data transmission channel a metric on the basis of weighted receptions symbols (w) calculated by said equalizer for a group of data tones.

In a preferred embodiment of the metric computation unit according to the present invention the calculation unit calculates for each bit of the group of four bits modulating two data tones of an OFDM symbol transmitted via said data transmission channel a log-likelihood ratio (LLR) as a metric on the basis of the weighted reception symbols (W) calculated by the equalizer for the two data tones.

In a preferred embodiment of the metric computation unit according to the present invention the channel and noise estimation unit estimates the channel response (h) and the noise variance (V) for each data tone during a preamble phase on the basis of a predetermined preamble signal.

In a preferred embodiment of the metric computation unit according to the present invention the estimated reception symbols (y), the equalizer coefficients (eq) and the weighted reception symbols (w) are complex.

In a preferred embodiment of the metric computation unit according to the present invention the equalizer coefficients (eq) of that equalizer are selected during the preamble phase for each data tone as follows: $eq(N)=h^*(n)/V(n)$ Wherein V(n) is the estimated noise variance of the data tone, $h^*(n)$ is the conjugate of the channel response h(n) of the data tone n.

In a preferred embodiment of the metric computation unit according to the present invention the for each tone n the values $P(n)=h(n) \cdot h^*(n)/V(n)$ are computed. Then, for each pair of tones $n_1$, $n_2$ used by the dual carrier modulation to modulate 4 bits, the following real value is computed:

$$dp(n_1,n_2)=4 \cdot b \cdot [p(n_1)-p(n_2)].$$

In a preferred embodiment the division by V(n) for deriving eq(n) and P(n) is approximated by the right shift operation (divide by $2^k$ for integer k).

In a preferred embodiment of the metric computation unit according to the present invention the calculation unit calculates the log-likelihood ratio (LLR) of said group of four bits on the basis of the weighted complex reception symbols for two data tones ($n_1$, $n_2$) as follows:

$$dw_r=2[b \cdot w_{r,1}-w_{r,2}]$$

$$sw_r=2[w_{r,1}+b \cdot w_{r,2}]$$

$$q_r=2(1+b) \cdot w_{r,1}+2(b-1) \cdot w_{r,2}$$

$$dw_i=2[b \cdot w_{i,1}-w_{i,2}]$$

$$sw_i=3[w_{i,1}-w_{i,2}]$$

$$q_i=2(1+b) \cdot w_{i,1}+2(b-1) \cdot w_{i,2}$$

$$dp=4 \cdot b \cdot [p(n_1)-p(n_2)]$$

$$LLR(bit\#1)=q_r+\log\{1+\exp(dp-dw_r)\}-\log\{1+\exp(dp+dw_r)\}$$

$LLR(\text{bit}\#2) = q_r + \log\{1+\exp(dp-sw_r)\} - \log\{1+\exp(dp+sw_r)\}$ $LLR(\text{bit}\#3) = q_i + \log\{1+\exp(dp-dw_i)\} - \log\{1+\exp(dp+dw_i)\}$ $LLR(\text{bit}\#4) = q_i + \log\{1+\exp(dp-sw_i)\} - \log\{1+\exp(dp+sw_i)\}$ Where $w_{r,n}$ is the real part of W(n) and $w_{i,n}$ is the imaginary part of W(n).

In the following preferred embodiments of the Dual Carrier Modulator (DCM) and the metric computation unit for a multiband OFDM transceiver of a ultra-wide-band (UWB) wireless personal access network according to the present invention are described with the reference to the enclosed figures.

DESCRIPTION

Figure 1:
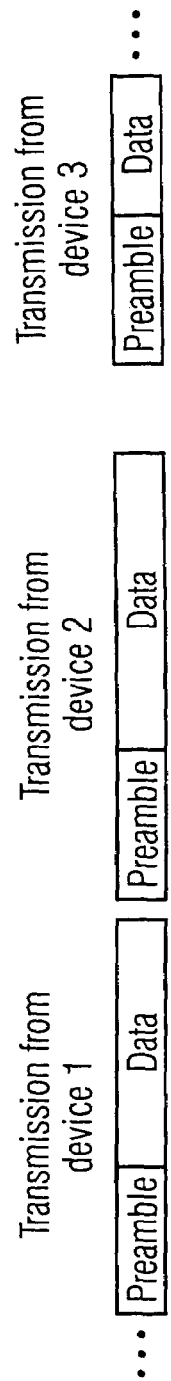
FIG. 1 shows a data transmission wireless system according to the state of the art.
Figure 2:
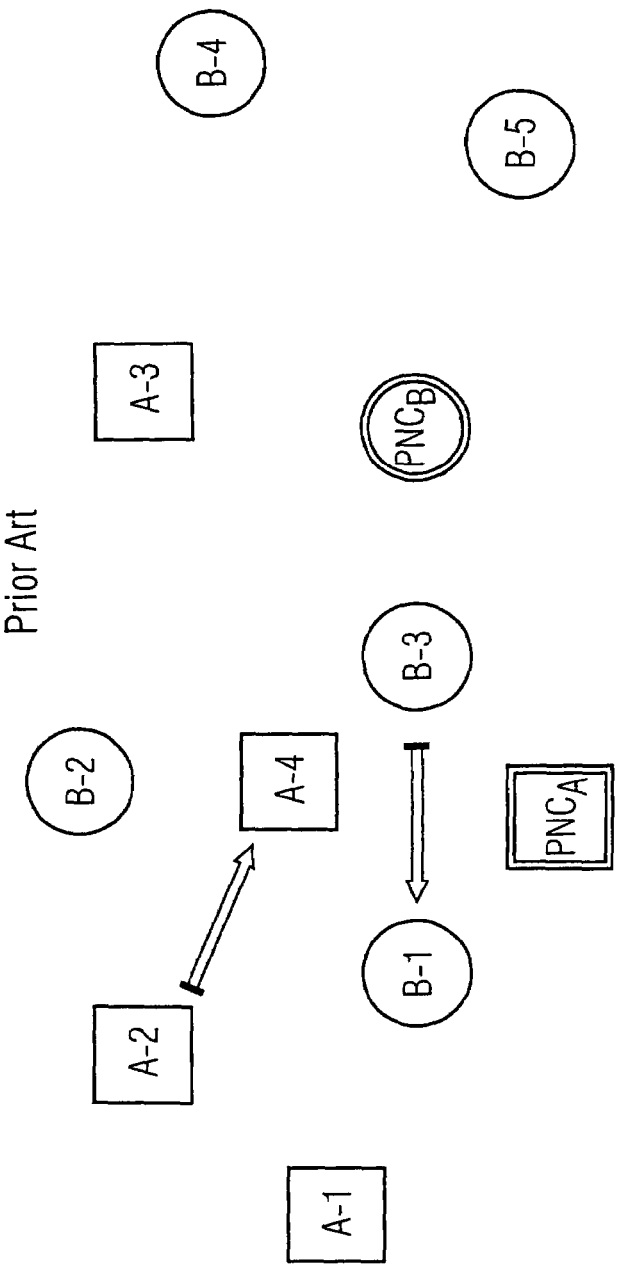
FIG. 2 shows two collocated wireless networks according to the state of the art.
Figure 3A:
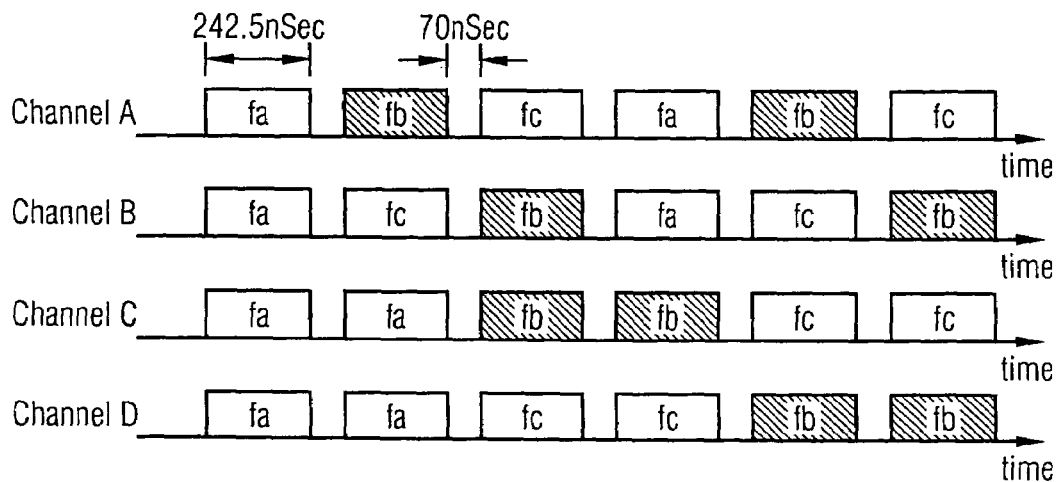
FIG. 3a shows a TFI frequency hopping pattern of an OFDM transceiver according to the state of the art.
Figure 3B:
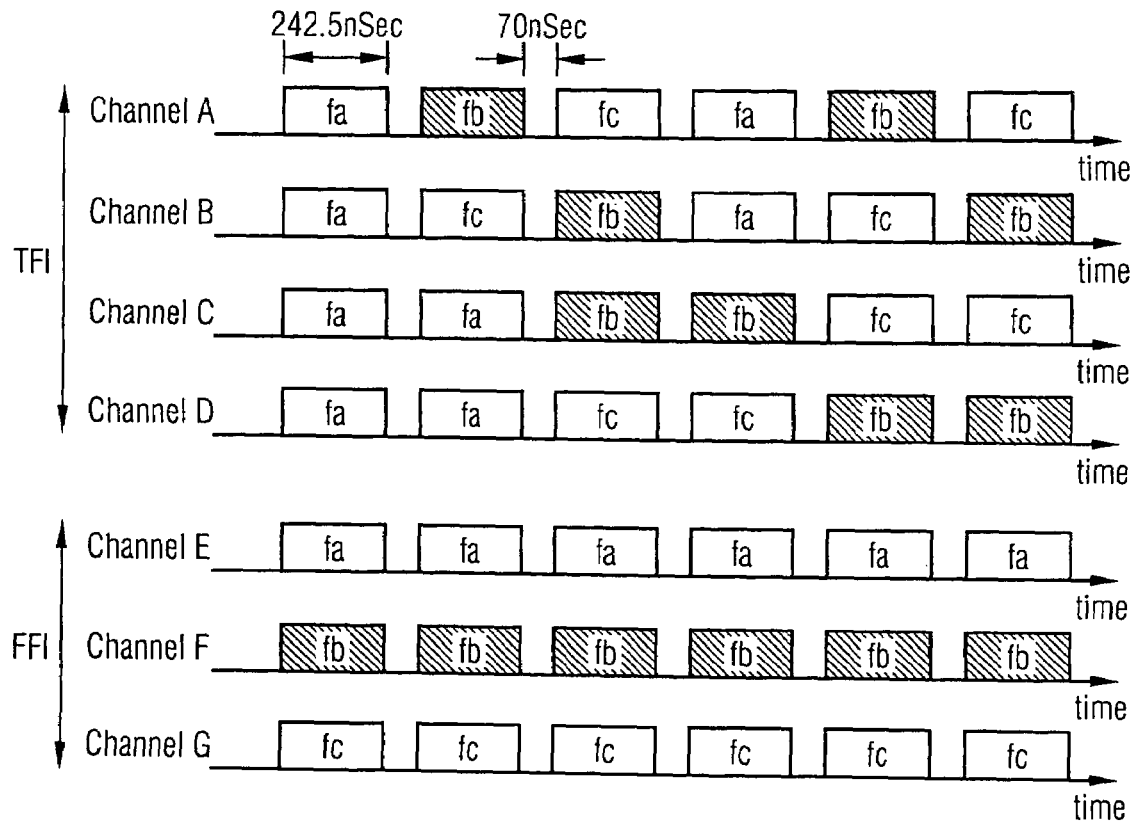
FIG. 3b shows a frequency hopping pattern of an OFDM transceiver according to the state of the art comprising a TFI mode and an FFI mode.
Figure 4:
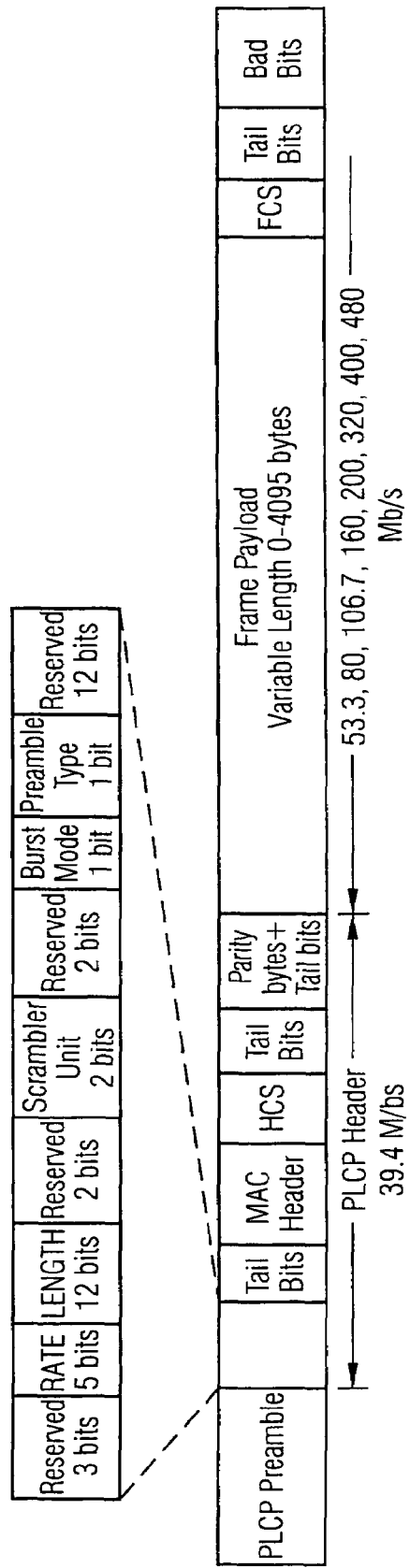
FIG. 4 shows the data structure of the PLCP-frame as employed by a conventional OFDM transceiver.
Figure 5:
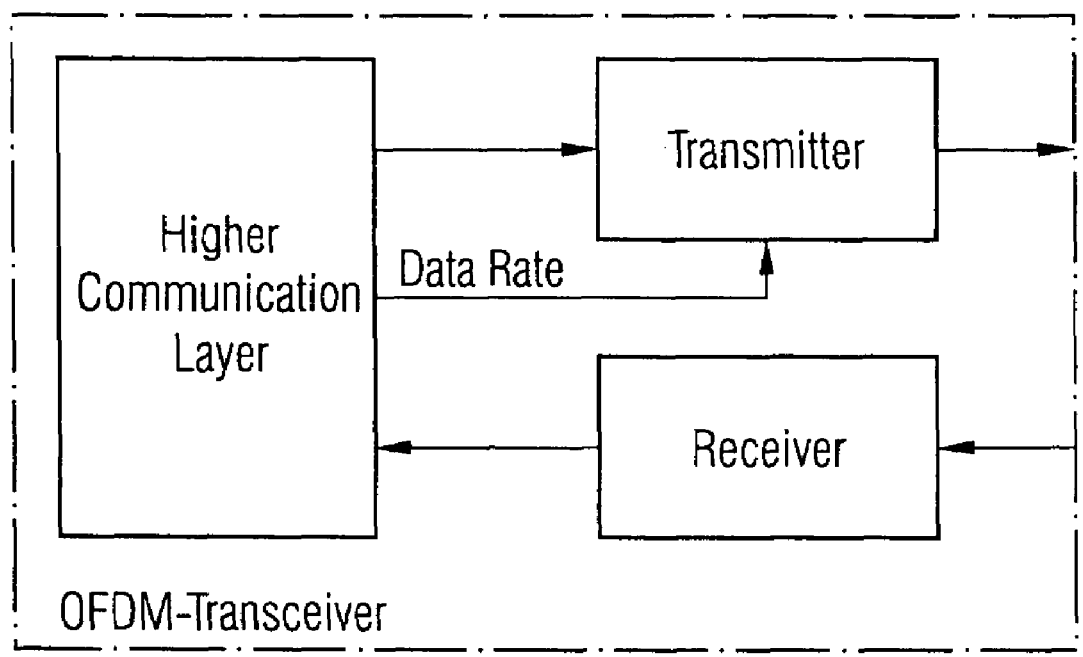
FIG. 5 shows a block diagram of a conventional OFDM transceiver having a transmitter and a receiver.
Figure 6:
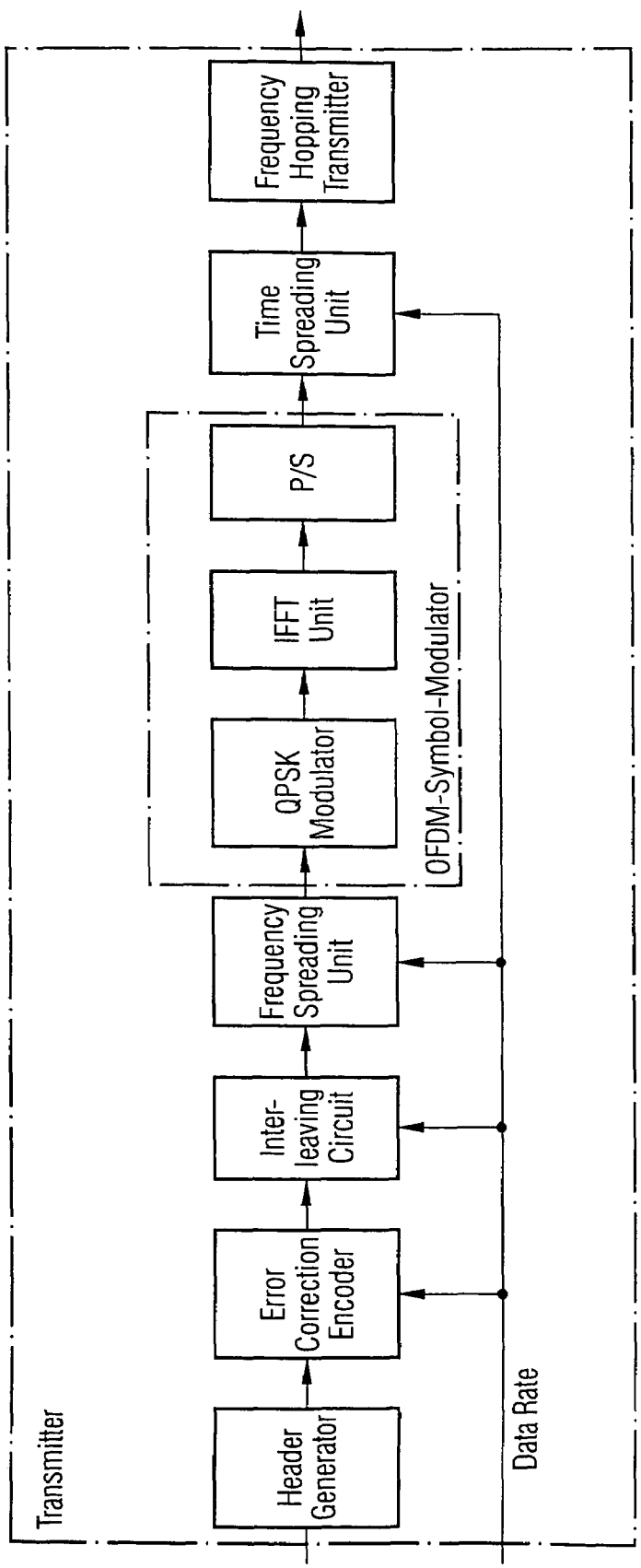
FIG. 6 shows a block diagram of a transmitter according to the state of the art.
Figure 7:
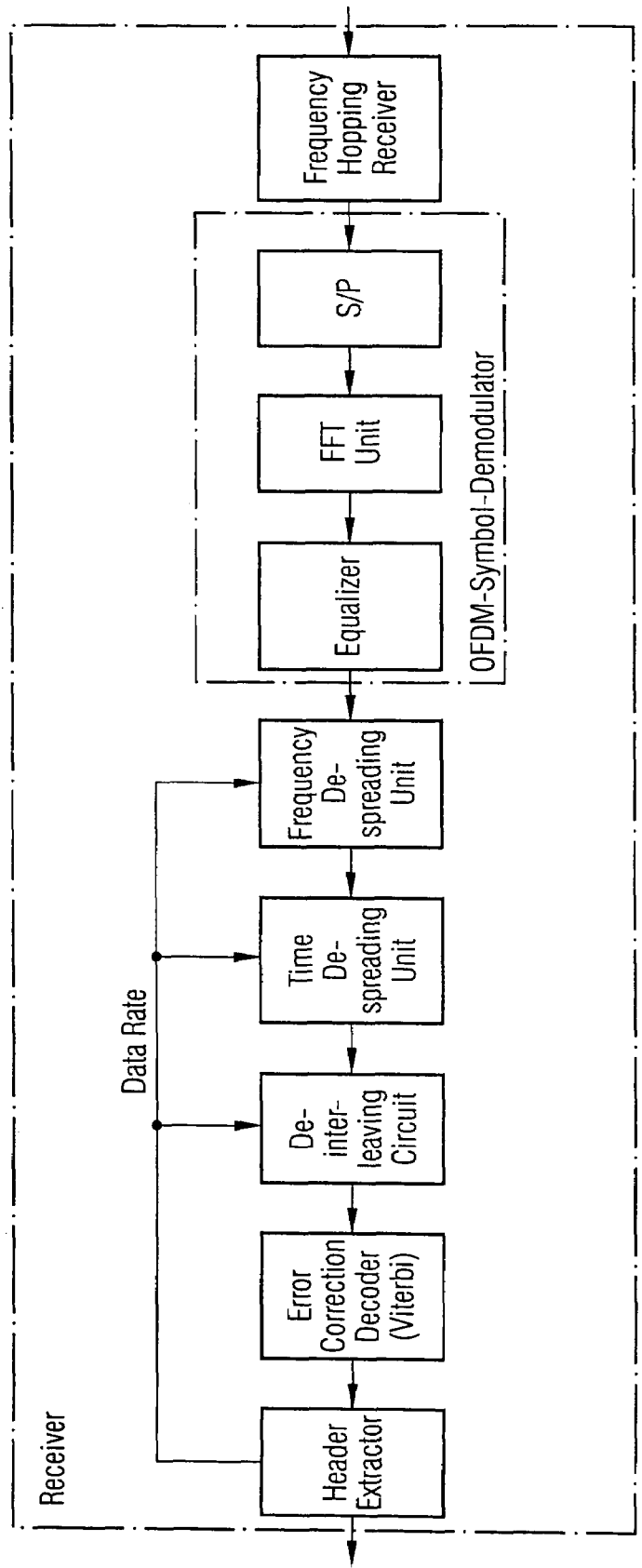
FIG. 7 shows a block diagram of a receiver according to the state of the art.
Figure 8:
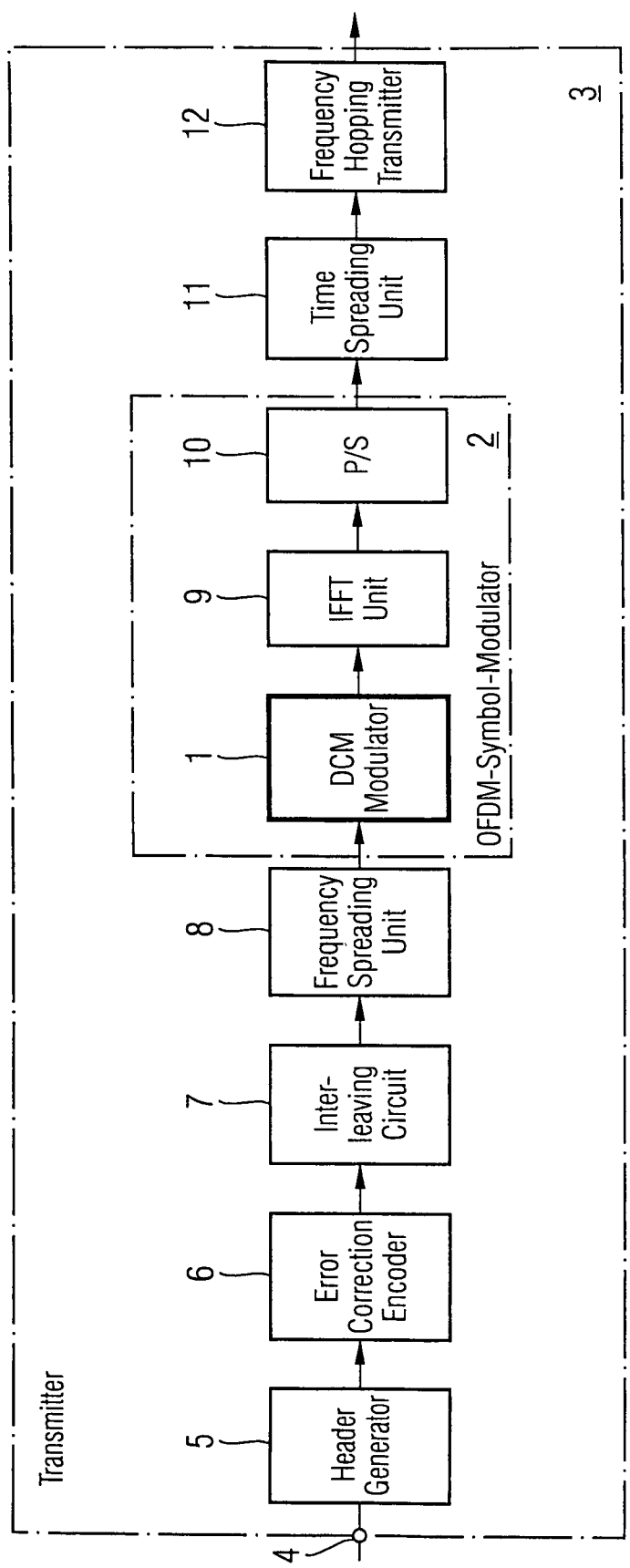
FIG. 8 shows a block diagram of a transmitter comprising a DCM Modulator according to the invention.

As can be seen from FIG. 8 the DCM Modulator 1 according to the present invention forms part of an OFDM symbol modulator 2 within a transmitter 3. This transmitter 3 comprises an input 4 to which a serial bit stream is supplied by a higher communication layer block. The bit stream coming from the higher communication layer block is received by a header generator 5 within the transmitter 3 which adds a PHY-header to the information payload. Within the PHY-header the data rate is preset. The header generator 5 is connected on its output side to an error correction encoder 6 which encodes a received data stream. These bits are encoded by the error correction encoder by means of a convolution code with puncturing. Additionally the PLCP-header of the PLCP frame is encoded using a Reed Solomon Code. The error correction encoder 6 is connected on its output side to an interleaving circuit 7. The bits are interleaved by the interleaving circuit 7. The interleaving circuit 7 interleaves the received bit stream to increase the performance of the data transmission wherein the interleaved bits are supplied to a frequency spreading unit 8 within the transmitter 3. The frequency spreading unit 8 spreads the received bits in the frequency domain with a frequency spreading factor FSF which is set according to the data rate of the transceiver.

The frequency spreading unit 8 is connected to the OFDM symbol modulator 2 within the transmitter 3 which includes the DCM modulator 1 according to the present invention. The Dual Carrier Modulator 1 receives the interleaved bit stream spread by the frequency spreading unit 8 and performs a Dual Carrier Modulation (DCM) for each sub-carrier or data tone within the selected frequency band depending on the data rate of the transceiver.

Figure 9:
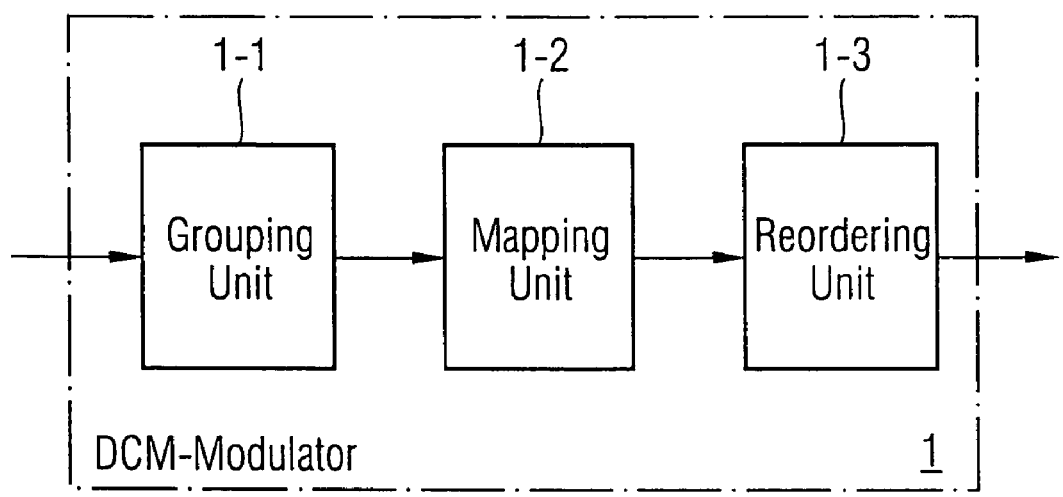
FIG. 9 shows a block diagram of a preferred embodiment of the DCM Modulator according to the present invention.

FIG. 9 shows a block diagram of a preferred embodiment of the DCM modulator 1 according to the present invention within the OFDM Modulator 2 of the transmitter 3. The Dual Carrier Modulator 1 as shown in FIG. 9 is provided for the multiband OFDM transceiver with an ultra-wide-band (UWB) wireless personal access network transmitting the modulated symbols. Each of the symbols is modulated by a predetermined number ($N_{CBPS}$) of bits encoded by the error correction encoder 6.

The Dual Carrier Modulator 1 according to the present invention comprises a grouping unit 1-1 which receives a bit stream from the frequency spreading unit 8 and which groups $N_{CBPS}$ encoded bits of the serial bit stream into bit groups each having a predetermined number m of bits. The grouping unit 1-1 groups in a preferred embodiment 200 encoded bits ($N_{CBPS}=200$) into bit groups each having four bits (m=4).

The DCM Modulator 1 further comprises a mapping unit 1-2. The mapping unit 1-2 is provided for mapping each bit group received from the grouping unit 1-1 to complex symbols (y). In a preferred embodiment the mapping unit 1-2 maps bit groups each having four bits respectively to two complex symbols to generate 100 complex symbols for modulating 100 data tones of an OFDM symbol. The grouping unit 1-1 groups the bit stream in quadrates. Each quadrate of four bits is converted by the mapping unit 1-2 to two complex symbols y.

Figure 10:
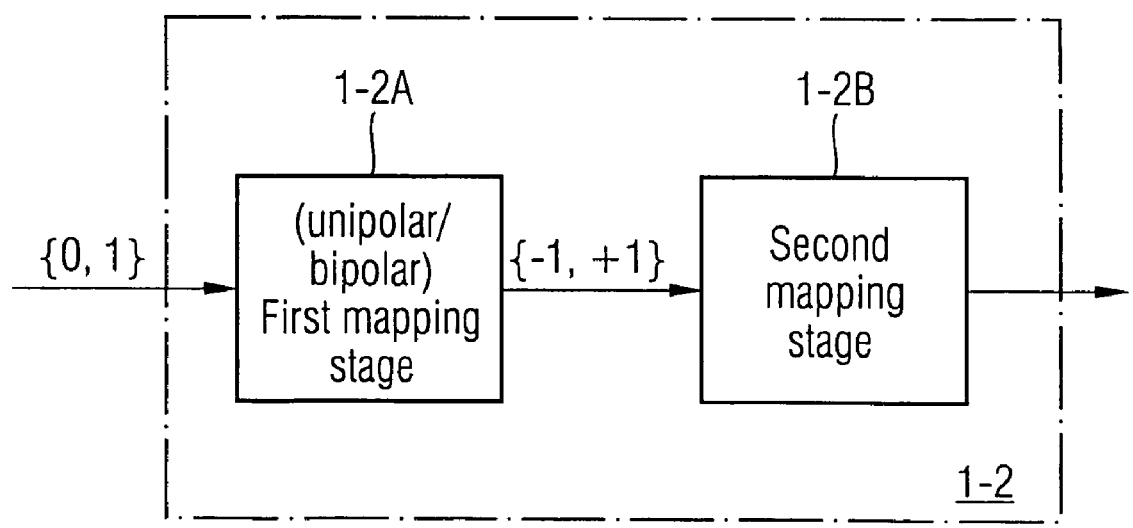
FIG. 10 shows a block diagram of a mapping unit within the DCM Modulator according to the present invention.

FIG. 10 shows a preferred embodiment of the mapping unit 1-2 of the DCM modulator 1. The mapping unit 1-2 comprises a first mapping stage 1-2a and the second mapping stage 1-2b. The first mapping stage 1-2a is provided for mapping unipolar bit values of the encoded bits within each bit group to bipolar values, i.e. the bits are mapped from {0,1} values to bipolar values {−1,+1}.

The second mapping stage 1-2b maps the four bipolar bits within each bit group to two complex symbols as follows:

$$\begin{pmatrix} y_n \\ y_{n+50} \end{pmatrix} = \frac{1}{\sqrt{b^2+1}} \begin{pmatrix} 1 & b \\ b & -1 \end{pmatrix} \begin{pmatrix} x_{a(n)} & jx_{a(n)+50} \\ x_{a(n)+1} & jx_{a(n)+51} \end{pmatrix}$$

with $n = 0, 1 \ldots 49$ $$a(n) = \begin{cases} 2n & n = 0, 1, 2, \ldots 24 \\ 2n+50 & n = 25, 26, \ldots 49 \end{cases}$$

wherein b is a constant.

The mapping unit 1-2 outputs pairs of complex symbols each having two complex symbol $y_n, y_{n+50}$. 100 such complex symbols $y_0, \ldots, y_{99}$ are used for modulating 100 data tones in a single OFDM symbol.

The bit grouping provides for a good performance in conjunction with the error correction code and interleaver design. The DCM Modulator 1 according to the present invention further comprises a reordering unit 1-3 connected to the output of the mapping unit 1-2. The reordering unit 1-3 re-orders the complex symbol y output by the mapping unit 1-2.

As can be seen from FIG. 9 by grouping the bits into groups of e.g. four bits it is made sure that adjacent bits in the encoded bit stream, i.e. output by the error correction encoder 6, do not participate in the same four bits group. Further data tones participating in the Dual Carrier Modulation have a distance in the frequency domain of $N_{CBPS}/4$ data tones apart, which is half a band part.

As can be seen from FIG. 8 the output of the DCM Modulator 1 according to the present invention as shown in FIG. 9 is connected to an IFFT unit 9 within the OFDM symbol modulator 2. The IFFT-unit 9 performs an inverse fast Fourier transformation to convert the signal into a time signal. The output of the IFFT-unit 9 is serialised by a parallel to serial converter 10 within the OFDM symbol modulator 2. On the output side the OFDM symbol modulator 2 is connected to a time spreading unit 11 which spreads the symbols for increasing processing gain and diversity. Finally the frequency hopping transmitter 12 transmits the OFDM symbol via the data transmission channel.

In a preferred embodiment the Dual Carrier Modulator 1 according to the present invention as shown in FIG. 9 is implemented by a look-up-table stored in a memory.

In a preferred embodiment the look-up-table start in the memory is given as follows:

| Input | | Output (y) | |
|---|---|---|---|
| $X_1$ | $X_2$ | Re $(y_n)$ | Re $(y_{n+50})$ |
| 1 | 1 | $K \cdot (1 + b)$ | $K \cdot (-1 + b)$ |
| 1 | 0 | $K \cdot (1 - b)$ | $K \cdot (1 + b)$ |
| 0 | 1 | $K \cdot (-1 + b)$ | $K \cdot (-1 - b)$ |
| 0 | 0 | $K \cdot (-1 - b)$ | $K \cdot (1 - b)$ |

| Input | | Output (y) | |
|---|---|---|---|
| $X_3$ | $X_4$ | Im $(y_n)$ | Im $(y_{n+50})$ |
| 1 | 1 | $K \cdot (1 + b)$ | $K \cdot (-1 + b)$ |
| 1 | 0 | $K \cdot (1 - b)$ | $K \cdot (1 + b)$ |
| 0 | 1 | $K \cdot (-1 + b)$ | $K \cdot (-1 - b)$ |
| 0 | 0 | $K \cdot (-1 - b)$ | $K \cdot (1 - b)$ |

In a preferred embodiment of the Dual Carrier Modulator according to the present invention the scaling factor K is selected to be $K_0/\sqrt{b^2+1}$ where $K_0$ is the corresponding scaling factor of the QPSK modulation.

The constant b is preferably set to two (b=2).

The optimal value of parameter b depends on several characteristics and parameters. It depends on the channel transfer function and on the design of other modem parameters. For example for the MB OFDM transceiver as proposed in the IEEE 802.15.3a for an UWB modem there are several data rate modes, wherein each data rate mode is characterised by a set of error correction code rates and the spreading level, i.e. time and frequency domain spreading. The error correction code rate and spreading levels determine the optional value of "b". When more spreading is used the optimum value of "b" is smaller and closer to one. For higher data rates that work at higher signal to noise ratios the optimal value of "b" is larger and closer to two. For small signal to noise ratio SNR the optimal value of the constant b converges to b=1. For large signal to noise ratios SNR the optimum value converges to b=2.

Figure 11:
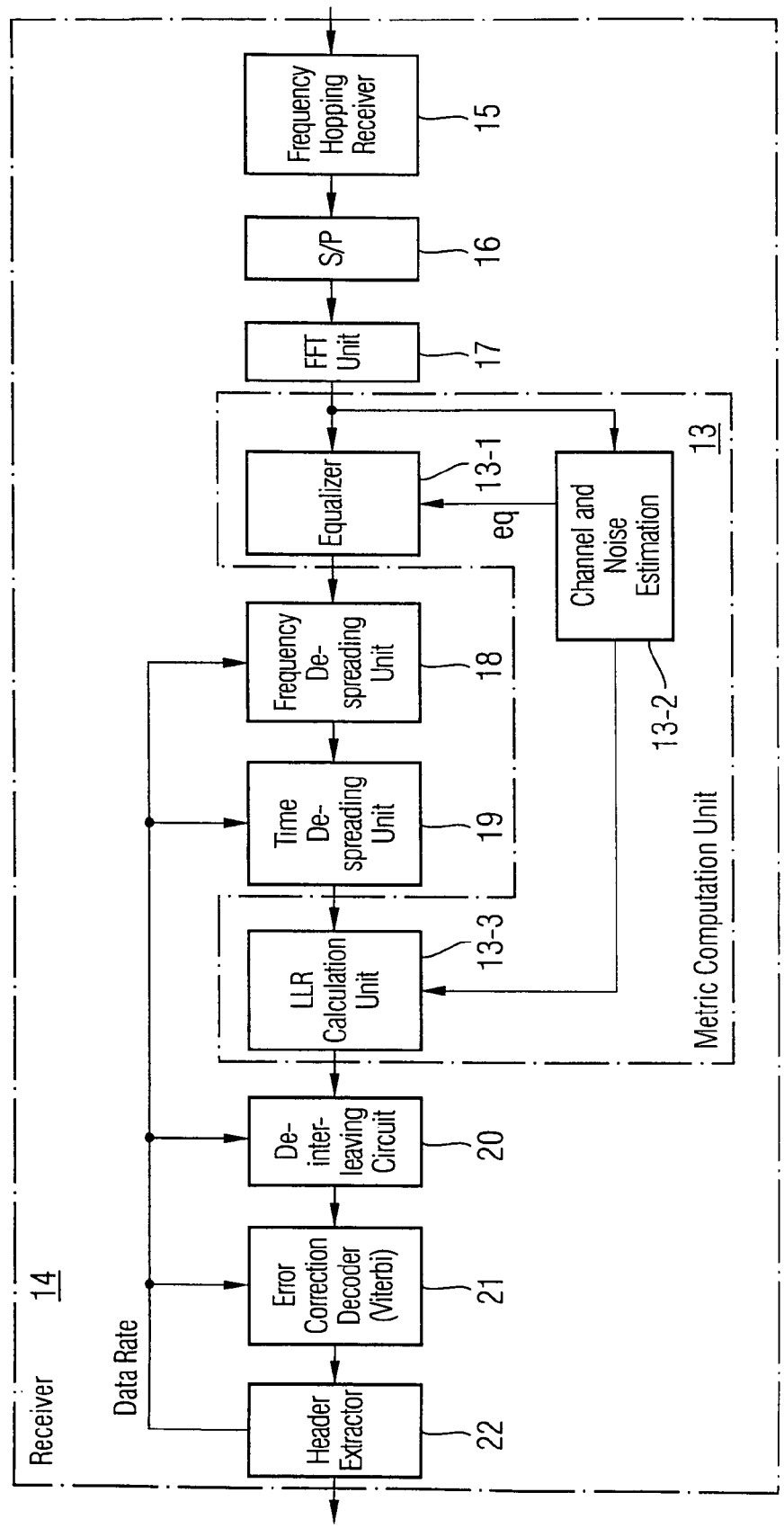
FIG. 11 shows a block diagram of a receiver comprising a metric computation unit according to the present invention.

FIG. 11 shows a block diagram of a metric computation unit 13 according to the present invention within the receiver 14. Receiver 14 performs the inverse operation to the transmitter 3 shown in FIG. 8. The receiver 14 comprises a frequency hopping receiver 15 receiving the transmitted OFDM symbols according to a predetermine frequency hopping pattern. The output of the frequency hopping receiver 15 is converted by a serial to parallel converter 16 to a parallel signal which is applied to the fast Fourier transformation unit 17. The fast Fourier transformation (FFT) is applied on selected frames of the time domain signal.

At the output of the FFT unit 17 there is a signal that is a noisy transformed version of the input of the inverse FFT at the transmitter.

For each transmitted symbol x(n) at the input of the inverse FFT unit a symbol y(n) is output by the FFT unit 17 as follows: $y(n)=h(n) \cdot x(n)+\gamma(n)$ where h(n) is the channel response of the respective tone and $\gamma(n)$ is the noise signal.

The variance of the noise signal $\gamma(n)$ is V(n). In general the channel response h(n) of the data transmission channel is complex.

The output of the FFT-unit 17 is connected to a one tap equalizer 13-1 within the metric computation unit 13 according to the present invention. The metric computation unit 13 comprises the equalizer 13-1, a channel and a noise estimation unit 13-2, a log-likelihood ratio calculation unit 13-3 as can be seen in FIG. 11. The output of the equalizer 13-1 is connected to the frequency de-spreading unit 18 and the time de-spreading unit 19 which perform the inverse operation to the frequency spreading unit 8 and the time spreading unit 11 within the transmitter 3 shown in FIG. 8. The output of the metric computation unit 13 is connected to a de-interleaving circuit 20 which performs the inverse operation to the interleaving circuit 7 shown in FIG. 8. The output of the interleaving circuit 20 is connected to error correction decoder 21, e.g. a Viterbi decoder. A header extractor 22 recognises the data rate of the received data stream of the OFDM symbols and adjusts the data rate for the de-interleaving circuit 20 the time and frequency de-spreading units 18, 19 and the error correction decoder 21.

The metric computation unit 13 which includes the channel noise estimation unit 13-2 is provided for estimating a channel response and a noise level for each data tone n to calculate a corresponding estimated reception symbol Y(n). On its input side the channel and noise estimation unit 13-2 is connected to the FFT-unit 17 and on its output side to the LLR calculation unit 13-3 and the equalizer unit 13-1. The channel and noise estimation unit 13-2 estimates a channel response h and a noise level V for each data tone during the preamble phase on the basis of a predetermine preamble signal and possibly adapted during the payload phase. In this preamble processing phase the equalizer coefficients of the equalizer 13-1 are adjusted by the channel and noise estimation unit 13-2 for each data tone:

$eq(n)=2h^*(n)/V(n)$ wherein $h^*(n)$ is the conjugate of the estimated channel response h(n). The equalizer coefficients eq are adjusted by the channel and noise estimation unit 13-2 via control lines as shown in FIG. 11.

V(n) may be computed for groups of adjacent tones, or even for the entire band, for reducing complexity.

Additionally for each data tone the following real number is computed:

$$p(n) = \frac{|h(n)|^2}{v(n)}$$

The sets of equalizer coefficient eq(n) and channel responses h(n) and the real values p(n) for each data tone n in each used band are computed by the channel and noise estimation unit 13-2.

Within unit 13-2, for each pair of tones $n_1$, $n_2$ used by the dual carrier modulation to modulate 4 bits, the following real value is computed:

$$dp(n_1,n_2) = 4 \cdot b \cdot [p(n_1) - p(n_2)].$$

In the preferred embodiment $n_2 = n_1 + N_{CBPS}/2 = n_1 + 50$.

The equalizer 13-2 multiplies each estimated reception symbol y(n) received from the FFT unit 17 to calculate for each data tone n a weighted reception symbol w(n).

$$w(n) = y(n) \cdot eq(n) = y(n) \cdot 2h^*(n)/v(n).$$

The value of the equalizer coefficient depends on the tone index, the band index (in the hopping sequence) and possibly on temporal noise estimators.

The LLR-calculation unit 13-3 calculates for each bit transmitted via the data transmission channel a metric on the basis of the weighted reception symbols (w) output by said equalizer 13-1 for a group of data tones. In a preferred embodiment the calculation 13-3 calculates for each bit within a group of four bits modulating two data tones of an OFDM symbol transmitted via the data transmission channel a log-likelihood ratio (LLR) as a metric on the basis of the weighted reception symbols (w) calculated by the equalizer 13-1 for the two data tones.

In a preferred embodiment the calculation unit 13-1 calculates the log-likelihood ratios (LLR) of said groups of four bits on the basis of the weighted complex reception symbols $(w(n_1), w(n_2))$ for two data tones $(n_1, n_2)$ as follows:

$$dw_r = 2[b \cdot w_{r,1} - w_{r,2}]$$

$$sw_r = 2[w_{r,1} + b \cdot w_{r,2}]$$

$$q_r = 2(1+b) \cdot w_{r,1} + 2(b-1) \cdot w_{r,2}$$

$$dw_i = 2[b \cdot w_{i,1} - w_{i,2}]$$

$$sw_i = 3[w_{i,1} - w_{i,2}]$$

$$q_i = 2(1+b) \cdot w_{i,1} + 2(b-1) \cdot w_{i,2}$$

$$dp = 4 \cdot b \cdot [p(n_1) - p(n_2)]$$

$$LLR(\text{bit\#1}) = q_r + \log\{1 + \exp(dp - dw_r)\} - \log\{1 + \exp(dp + dw_r)\}$$

$$LLR(\text{bit\#2}) = q_r + \log\{1 + \exp(dp - sw_r)\} - \log\{1 + \exp(dp + sw_r)\}$$

$$LLR(\text{bit\#3}) = q_i + \log\{1 + \exp(dp - dw_i)\} - \log\{1 + \exp(dp + dw_i)\}$$

$$LLR(\text{bit\#4}) = q_i + \log\{1 + \exp(dp - sw_i)\} - \log\{1 + \exp(dp + sw_i)\}$$

Computation of $\log\{1 + \exp(x)\}$ is performed in one embodiment by a look-up-table. In an alternative embodiment the above function is substituted by the following approximation:

$$\log\{1 + \exp(x)\} \approx \begin{cases} x & \text{if } x > 0 \\ 0 & \text{if } x \leq 0 \end{cases}$$

The metric computation unit 13 according to the present invention has the advantage that it has a comparatively low technical complexity. The required additional computation for deriving the log-likelihood ratio (LLR) per encoded bit comprises multiplications by constants some real operations and two look-up-table mapping operations. For the special case b=1 the complexity is even smaller comprising only 5 real additions and two look-up-table mapping operations. From the complexity perspective the embodiment with constant b=1 provides the lowest complexity. For better performance other values of b may be selected. In a preferred embodiment a scaling factor is chosen to be b=2. In this embodiment the additional computation for deriving log-likelyhood ratios per bit are 6 additions and two look-up-table mapping operations.

The invention provides means to improve the performance for coded OFDM symbols and in particular for multiband OFDM symbols. The performance is improved compared to transceivers using a conventional QPSK modulator where the error correction layer has to recover from frequency selective channels. The dual carrier modulator (DCM) according to the present invention increases frequency diversity to get less variability and improves the overall performance of the error correction layer. In a preferred embodiment the Dual Carrier Modulator is based on grouping a pair of tones and loading four bits on each pair of tones. This has the consequence that the qualities, i.e. signal to noise ratios (SNR) of the bits metrics are similar. In the specific embodiment where one data tone is attenuated to zero (spectral null) instead of having two erased bits on the input of the error correction layer the dual carrier modulator according to the present invention and the corresponding metric computation unit 13 uses two tones for each bits, and very likely the other tone provides helpful information. In a preferred embodiment the DCM modulator uses a 2'2 orthogonal mapping for producing two symbols that modulate two tones. A substantial improvement is achieved when the error correction layer uses high data rates.

The invention claimed is:

1. A dual carrier modulator (DCM) for a multiband orthogonal frequency division multiplexing (OFDM) transceiver of an ultra wide band (UWB) wireless network transmitting OFDM modulated symbols, wherein each OFDM symbol is modulated by a first predetermined number ($N_{CBPS}$) of encoded bits, said dual carrier modulator comprising:

(a) a grouping unit configured to group the $N_{CBPS}$ encoded bits of a serial bit stream into bit groups each having a second predetermined number (m) of bits;

(b) a mapping unit configured to map each bit group received from said grouping unit to complex symbols (y); and (c) a reordering unit configured to reorder the complex symbols (y) mapped by said mapping unit, wherein each complex symbol (y) is provided to modulate a corresponding data tone of an OFDM symbol;

wherein the first predetermined number is two hundred ($N_{CBPS}$=200) and the second predetermined number is four (m =4), such that the grouping unit groups two hundred encoded bits to bit groups each having four bits;

wherein the mapping unit maps bit groups each having four bits respectively to two complex symbols ($y_n$; $y_{n+NCBPS/}$ 4) to generate $N_{CBPS}/2$ complex symbols ($y_0 \ldots y_{NCBPS}/2$) for modulating one $N_{CBPS}/2$ data tones of an OFDM symbol;

wherein the mapping unit (1-2) comprises:

a first mapping stage for mapping unipolar bit values of the encoded bits within each bit group to bipolar bit values, and a second mapping stage which provides an orthogonal 2×2 mapping of two complex numbers composed of the 4 bipolar bits into two complex symbols; and wherein the orthogonal 2×2 mapping is defined by the equation:

$$\begin{pmatrix} y_n \\ y_{n+50} \end{pmatrix} = \frac{1}{\sqrt{b^2+1}} \begin{pmatrix} 1 & b \\ b & -1 \end{pmatrix} \begin{pmatrix} x_{a(n)} & jx_{a(n)+50} \\ x_{a(n)+1} & jx_{a(n)+51} \end{pmatrix}$$

wherein $n = 0, 1 \ldots 49$ $$a(n) = \begin{cases} 2n & n = 0, 1, 2, \ldots 24 \\ 2n + 50 & n = 25, 26, \ldots 49 \end{cases}$$

wherein b is a constant.

2. The dual carrier modulator of claim 1, wherein the mapping unit is formed by a look-up-table stored in a memory.

3. The dual Carrier Modulator according to claim 1, wherein the look-up-table stored in said memory is given as follows:

| Input | | Output (y) | |
|---|---|---|---|
| $X_1$ | $X_2$ | Re ($y_n$) | Re ($y_{n+50}$) |
| 1 | 1 | $K \cdot (1+b)$ | $K \cdot 1+b)$ |
| 1 | 0 | $K \cdot (1-b)$ | $K \cdot 1+b)$ |
| 0 | 1 | $K \cdot (-1+b)$ | $K \cdot (-1-b)$ |
| 0 | 0 | $K \cdot (-1-b)$ | $K \cdot (1-b)$ |

| Input | | Output (y) | |
|---|---|---|---|
| $X_3$ | $X_4$ | Im ($y_n$) | Im ($y_{n+50}$) |
| 1 | 1 | $K \cdot (1+b)$ | $K \cdot (-1+b)$ |
| 1 | 0 | $K \cdot (1-b)$ | $K \cdot (1+b)$ |
| 0 | 1 | $K \cdot (-1+b)$ | $K \cdot (-1-b)$ |
| 0 | 0 | $K \cdot (-1-b)$ | $K \cdot (1-b)$ | wherein $$K = \frac{1}{\sqrt{b^2+1}}$$

is a real constant.

4. The dual carrier modulator of claim 3, wherein the constant b is two (b=2).

5. The dual carrier modulator of claim 1, wherein the constant b is two(b=2).

* * * * *